United States Patent Office 3,499,878
Patented Mar. 10, 1970

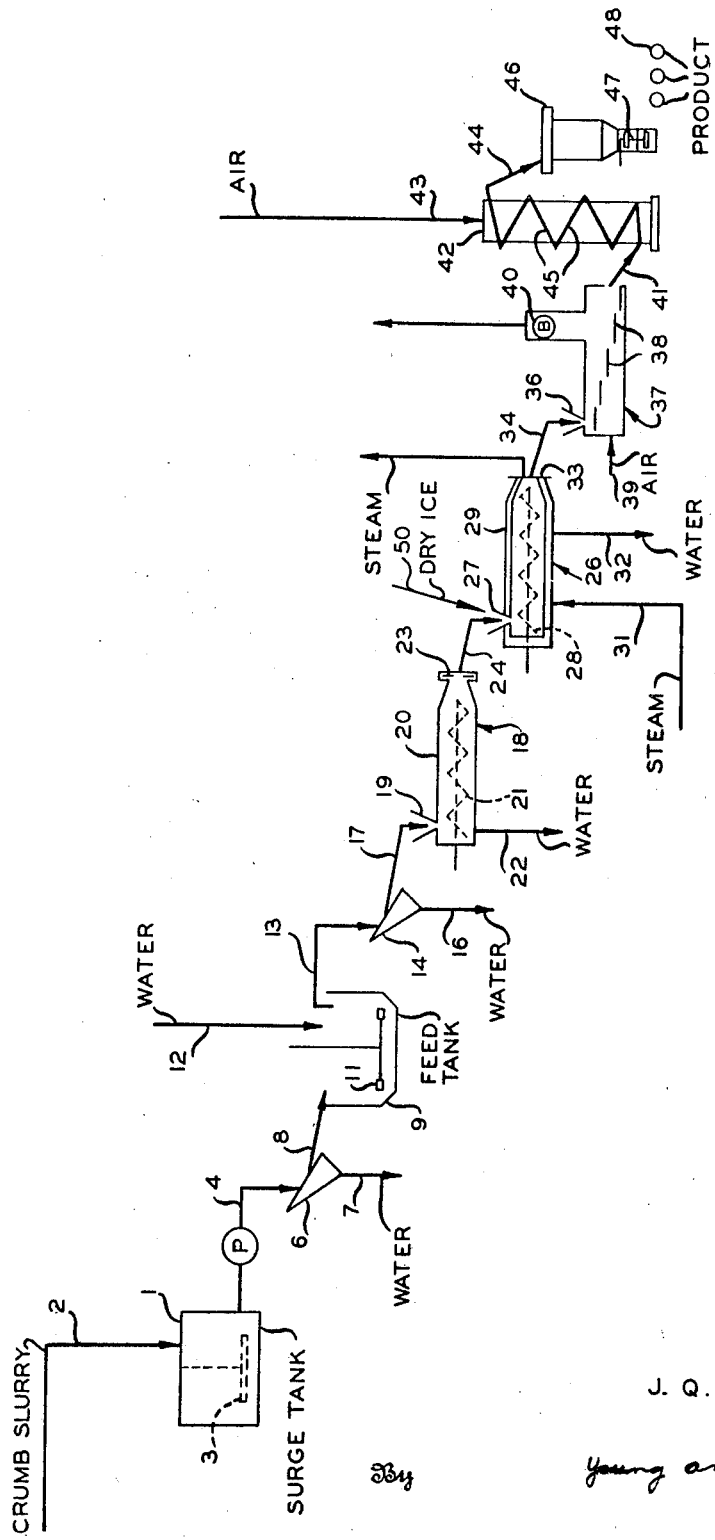

3,499,878
REMOVAL OF WATER FROM SOLID POLYMERS
James Q. Wood, Bartlesville, Okla., assignor to Phillips Petroleum Company, a corporation of Delaware
Filed Aug. 24, 1966, Ser. No. 574,612
Int. Cl. C08d 5/00; C08f 1/88
U.S. Cl. 260—85.1         5 Claims

ABSTRACT OF THE DISCLOSURE

A dewatering process for solid polymers is improved by the addition of Dry Ice to a confined zone so that the carbon dioxide gas released in the zone reduces the partial pressure of the water vapor therein and thereby enables the polymer to be dried to lower water levels when the polymer is passed to a reduced pressure zone and the associated water flashes into vapor.

---

This invention relates to the removal of water from water slurries of solid elastomers. In one aspect, it relates to employing Dry Ice for removing physically combined water from water slurries of solid elastomers, such as cis-1,4-polybutadiene. In another aspect it relates to the removal of water from polymers that were prepared in a solvent and the water introduced when the solvent was steamed off.

In many industrial processes solid products are produced as dispersions, suspensions, or slurries in water. Where the water content of such mixtures is high, such as 50 weight percent or more, the removal of the bulk of the physically combined water (i.e., free water and occluded water) from the solid product by thermal heating or air drying is not feasible or economically advantageous. Accordingly, it has been found advantageous to remove the bulk of the physically combined water by mechanical dewatering processes. Processes of the latter type have been found particularly advantageous in the synthetic rubber industry because the water content of slurries of solid elastomer coagulum or crumb must be reduced to one weight per cent or lower. Such mechanical dewatering processes generally utilize a combination of mechanical devices, such as shaker screens, mechanical screw presses (expellers), mechanical dryers (expanders), vibrating conveyors, etc. Though such mechanical handling and dewatering equipment has been proven advantageous, the efficient operation of such equipment is often hampered because of the sticky or tacky nature of the wet rubber crumb.

For example, in mechanically handling and dewatering water slurries of wet, hot elastomer crumb, the sticky elastomer tends to stick to conveyor belts, screw conveyors, drive shafts, etc., and gives rise to such problems as bridging in hoppers, plugging of pipes, outlets, etc.; as such, it often becomes necessary for the operator to manually clear away the elastomer obstructions and in some cases causes him to shut down equipment for purposes of cleaning off the adhering, plugging and bridging elaster. When the full efficiency of the equipment is not realized, operating expenses increase and capacity decreases.

The wet rubber crumb usually enters the expander dryer portion of the drying assembly containing about 10 to about 12 percent water by weight. Consistent removal of this relatively large amount of water from this rubber crumb in the expander dryer to less than the final product specification level maximum of 0.75 percent by weight is difficult to achieve on a commercial scale. As a result, some 15 percent or so of the "dried" rubber product is "off" specification and must be rerun to reduce the water level below 0.75 weight percent. This amounts to a very expensive procedure.

Accordingly, one object of this invention is to provide a process which improves the mechanical removal of physically combined water from solid materials, such as elastomer crumb mixed with water in the form of a slurry.

Another object is to provide a process for removing the bulk of the physically combined water (i.e., free water and occluded water) from a water slurry of elastomer coagulum or crumb, such as cis-1,4-polybutadiene.

Yet another object of this invention is to provide a process for the removal of the water from a wet elastomer crumb or polymer in order to reduce the maximum water content to less than 0.75 percent by weight in the final rubber product.

Further objects and advantages of this invention will become apparent from the following discussion, appended claims, and the accompanying drawing wherein a schematic flow sheet illustrates a representative process of handling and mechanically dewatering a water slurry of elastomer crumb, illustrating the novel features of this invention associated therewith.

Briefly, I have discovered that these objects, enumerated hereinabove, can be effected by the step of continuously adding solid $CO_2$ to an elastomer or polymer in an amount sufficient to reduce the water content of said elastomer below one percent by weight.

Further understanding of the subject invention will be gained by consideration of the accompanying drawing. In the drawing, there is illustrated a conventional surge tank 1 containing a water slurry of elastomer crumb, the slurry being supplied via line 2, usually at an elevated temperature, e.g. about 200° F., and having a water content in excess of 50 weight percent. Tank 1 is continuously agitated by a suitable agitator 3. The concentration of water in the slurry of elastomer crumb can vary, wherein the slurry can have from 5 to 15 percent rubber crumb in the water-crumb media. Each piece of wet crumb contains from 50 to 95 percent water. The slurry is continuously withdrawn from tank 1 and pumped via line 4 to a shaker screen 6 or the like where the bulk of the free water is removed via line 7. The thus partially dewatered elastomer crumb is then passed via line 8 to a suitable feed tank 9 or the like, provided with motorized paddle 11 or the like. Water is supplied to tank 9 via line 12 to cool the elastomer crumb (if desired), the temperature of the added water being usually between 65 and 105° F., preferably 75 to 85° F. The resulting diluted and cooled slurry overflows from tank 9 via line 13 to a second shaker screen 14 or the like where the bulk of the relatively cooler free water is removed via line 16. The partially dewatered and cooled elastomer crumb, with a water content of about 50 weight percent, is then passed via line 17 to a suitable mechanical dewatering equipment 18, such as a water expeller or continuous mechanical screw press, for removal of occluded water. An expeller of this type which can be used is a V. D. Anderson Company No. 5 Moisture Expeller. In this type of apparatus, the elastomer crumb, drained of free water, is continuously fed to feed hopper 19 and passes through the length of the device by means of suitable worms or screws 21 within a barrel housing 20, such movement of the elastomer crumb causing compaction as well as mechanical working of the elastomer, thus inducing a flow of occluded water, between the barrel staves, which drains from the device via line 22. The compacted and dewatered elastomer crumb is then extruded from the outlet of the device where a built-in cutter 23 shreds the elastomer to the proper degree. The shredded elastomer crumb, now having a moisture content in the range of about 5 to 15 weight percent, is then preferably passed via line 24 to a mechanical dryer generally designated 26, such as a V. D. Anderson Company Expander-Dryer, for further removal of the small amount of occluded water left in the elastomer crumb. In this type of apparatus 26, the elastomer crumb is fed into a hopper 27 and passed along the length of the device by means of suitable worms 28 or the like, the crumb being compacted to pressures, ahead of the discharge, of several hundred pounds per square inch. The mechanical energy of the shaft rotating against the crumb and the heat input from an external jacket 29, to which steam 31 is supplied, causes the apparatus to work as a heat exchanger. The water in the elastomer crumb is maintained in the liquid state along the length of the dryer, due to the pressure applied by the worm arrangement, and is not permitted to escape as vapor.

In my improved process, I propose to add Dry Ice which is fed from a source not shown via line 50 into hopper 27.

This Dry Ice (solid $CO_2$) addition would be at a rate equivalent to about 20 to 40 percent of the contained water in the rubber feed passing to the dryer 26. The sublimation of the "Dry Ice" and the subsequent heating of the gas to 250 to 300° F. in the expander apparatus 26 will have a relatively negligible effect on the temperature of the rubber-water mass in the dryer. This carbon dioxide gas released in dryer 26 reduces the partial pressure of the water vapor in the dryer and thereby enables rubber to be dried to consistently lower water levels and reduces the amount of "wet rubber" that had to be previously reworked through the dryer. The elastomer is finally passed through an opening in a die plate 33 at an elevated temperature, e.g., about 300° F., the water flashing into vapor as it passes through the opening in the die plate. This rapid expansion of the water into steam vapor as the mixture leaves the dryer 26 causes an expansion of the elastomer into a very porous structure, which permits the escape of any residual moisture in the elastomer. The elastomer in this expanded form will have a moisture content generally below the specification maximum of 0.75 weight percent, e.g., 0.5 weight percent or less. The expanded elastomer can be passed via line 34 into the hopper 36 of a vibrating conveyor 37. The conveyor 37 is preferably provided with a cascade arrangement of vibrating plates 38 and as the elastomer crumb passes from one plate to the next plate it is caused to tumble forward by relatively cool air passed into the conveyor via line 39. A blower on the like 40 induces the flow of further air through other openings in the conveyor so as to remove the air heated by contact with the elastomer. This type of vibrating conveyor is fully described and claimed in copending application Ser. No. 856,064, filed Nov. 30, 1959 by C. L. Davis et al.

The particulate elastomer, having a relatively low moisture content, e.g., 0.5 weight percent, is removed from the vibrating conveyor 37 via line 41 and passed to suitable baling or packaging equipment. For example, the dried elastomer can be passed to a vibrating spiral elevator 42, to which air may be supplied at the top via line 43. The dried crumb is elevated by the upward jerking motion of flights 45, in a well-known manner, and dumped via line 44 into the upper open end of a baler 46, provided with a suitable piston arrangement 47 for the compression of the dried elastomer crumb into suitable bales 48.

The following example illustrates the subject invention, but it should be understood that the various conditions, amounts, etc., recited in this example should not be construed to limit unduly this invention.

EXAMPLE

A homopolymer of 1,3-butadiene of approximately 95 percent cis-1,4-addition is prepared by polymerizing butadiene in toluene solvent in the presence of an initiator comprising a mixture of triisobutylaluminum, titanium tetrachloride, and titanium tetraiodide. Following polymerization, the catalyst is inactivated and an antioxidant added. The solvent is removed by steam stripping, yielding a rubber having a Mooney viscosity (ML–4 at 212° F.) of 43.5. The rubber crumb is mixed with water to form a water slurry, about 5.7 weight percent rubber crumb. The slurry of rubber crumb is pumped at a rate of 135 gallons per minute and at a temperature of 200° F. to a slurry surge tank 1 of the accompanying drawing. The elastomer slurry is agitated and continuously pumped via line 4 at the rate of 140 gallons per minute onto shaker screen 6, where the bulk of free water, at about 200° F., is removed. The wet elastomer is passed via line 8 to feed tank 9, where it is reslurried with water supplied via line 12 at the rate of 120 gallons per minute and at a temperature of 80° F. The cooled slurry of elastomer overflows tank 9 at about 90° F. and is passed via line 13 to shaker screen 14, where the bulk of the free water is removed via line 16. The wet rubber crumb, having about 50 percent water, is then passed into expeller 18 at the rate of 5,500 pounds per hour of rubber and 5,500 pound per hour of water. The thus dewatered elastomer, having a water content of about 12 weight percent, is then fed to expander-dryer 26, wherein Dry Ice at the rate of 188 pounds per hour (25 percent of the contained water in the rubber-water feed to the expander) is introduced via conduit 50 into the hopper 27. The rubber is removed from die 33 at the end of hopper dryer 26 at the rate of 5,500 pounds per hour and having a water content of less than 0.5 percent by weight water. Expanded, dried elastomer is then passed by vibrating conveyor 37 to the bottom of the vibrating spiral elevator 42, in which it is elevated and cooled and the dried elastomer, having a water content of less than 0.5 percent water, is then baled in baler 46, wrapper, bagged, and conveyed to storage, etc.

The synthetic elastomers which can be processed according to this invention include those made by emulsion polymerization of conjugated dienes having from four to eight carbon atoms per molecule or the copolymerization of mixtures of such conjugated dienes or the copolymerization of such conjugated dienes with copolymerizable monomers containing the $CH_2=C<$ group, such as styrene. Copolymers of isoolefins and conjugated dienes in which the isoolefin has from four to eight carbon atoms per molecule and is in a major amount and the conjungated diene has from four to six carbon atoms per molecule in a minor amount, known generally as butyl rubber, can be employed in this invention.

Synthetic elastomers such as butadiene-styrene copolymers, butadiene-acrylonitrile copolymers, polybutadiene, polyisoprene, polychloroprene, and the like can be processed by this invention. The preparation of these polymers is well known and as an example thereof reference is made to U.S. Patent 2,426,427 issued Aug. 5, 1958 to R. A. Findlay.

This method is also applicable to polyolefin solution polymer processes wherein the solvent is steamed off and the water so introduced removed by mechanical expression. By introducing carbon dioxide into the mechanical expressor I achieve greater water removal during the dewatering step.

Obviously many modifications and variations of the present invention are possible in the light of the above teachings. It is therefore to be understood that within the scope of the appended claims the invention may be practiced otherwise than as specifically described herein.

What is claimed is:

1. In a process for removing water from wet solid polymer containing about 5 to 15 weight percent water by passing said wet polymer into a confined zone wherein said polymer is compacted and heated and then passed to a zone of reduced pressure wherein water associated with said polymer flashes into vapor, the improvement comprising adding solid carbon dioxide to said confined zone at a rate equivalent to about 20 to 40 percent of the weight of water contained in said wet solid polymer that is passed to said confined zone.

2. A process according to claim 1 wherein said polymer is a polymer of a conjugated diene having 4 to 8 carbon atoms per molecule.

3. A process according to claim 1 wherein said polymer is a copolymer of said conjugated diene and a copolymerizable monomer containing the $CH_2=C<$ group.

4. A process according to claim 2 wherein said polymer is a homopolymer of 1,3-butadiene of approximately 95 percent of cis-1,4-addition.

5. A process according to claim 3 wherein said conjugated diene is butadiene and said copolymerizable monomer is styrene.

References Cited

UNITED STATES PATENTS 3,240,746  3/1966  Davis _____ 260—94.7

JOSEPH L. SCHOFER, Primary Examiner
WILLIAM F. HAMROCK, Assistant Examiner

U.S. Cl. X.R.

260—82.1, 83.3, 86.7, 87.3, 88.2, 92.3, 94.7, 94.9, 96